Jan. 22, 1952 P. R. POWELL 2,583,119
APPARATUS FOR FORMING RETRACTILE CORDS
Filed Aug. 19, 1949 5 Sheets-Sheet 1

INVENTOR
P. R. POWELL
BY *[signature]*
ATTORNEY

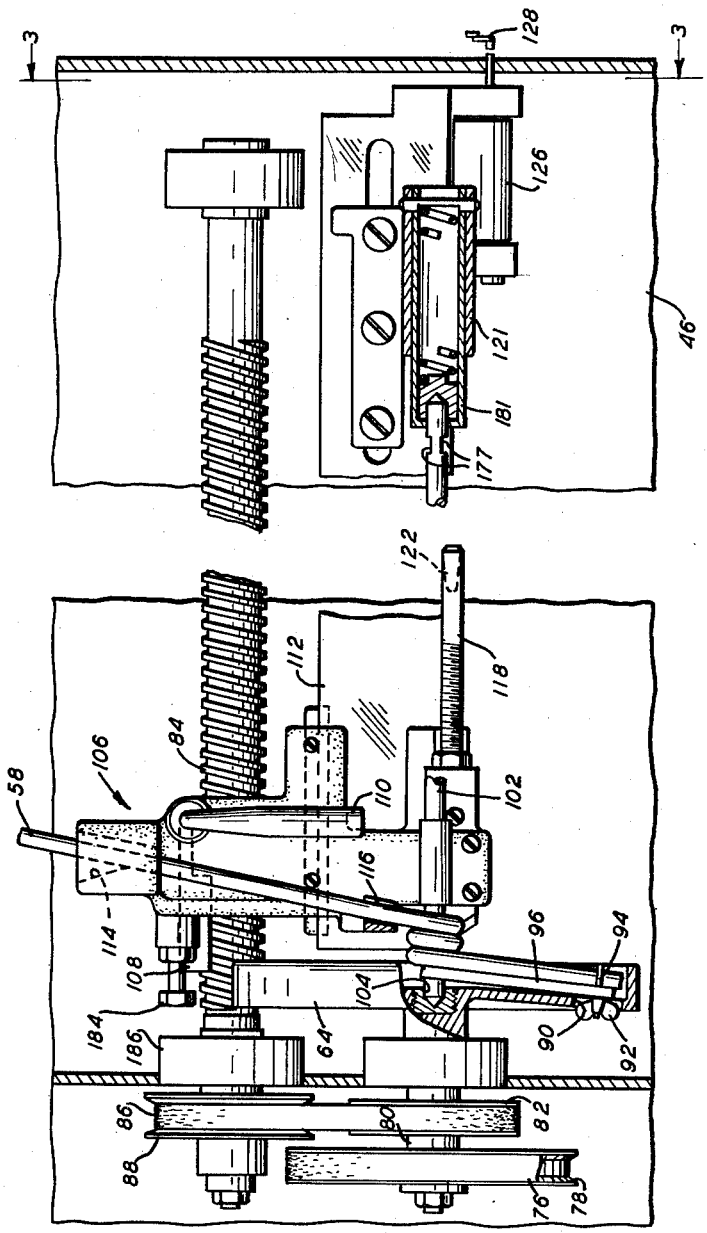

Jan. 22, 1952  P. R. POWELL  2,583,119
APPARATUS FOR FORMING RETRACTILE CORDS
Filed Aug. 19, 1949  5 Sheets-Sheet 3
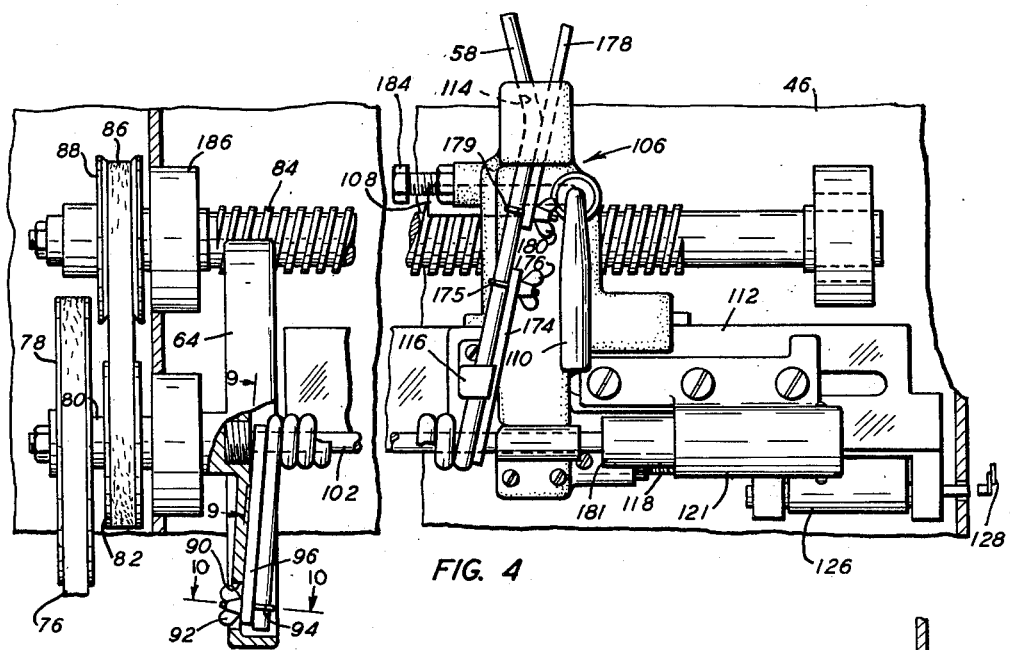
FIG. 4
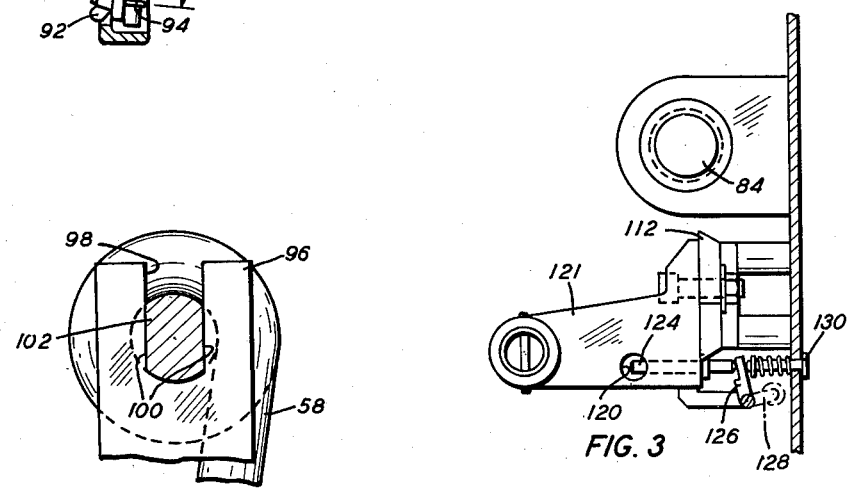
FIG. 9
FIG. 3
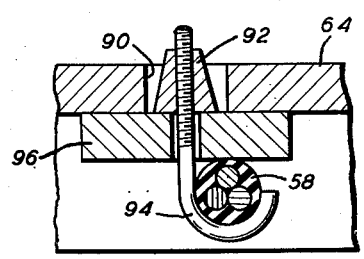
FIG. 10
INVENTOR
P. R. POWELL
BY
ATTORNEY

INVENTOR
P. R. POWELL
BY
ATTORNEY

Jan. 22, 1952 P. R. POWELL 2,583,119
APPARATUS FOR FORMING RETRACTILE CORDS
Filed Aug. 19, 1949 5 Sheets-Sheet 5
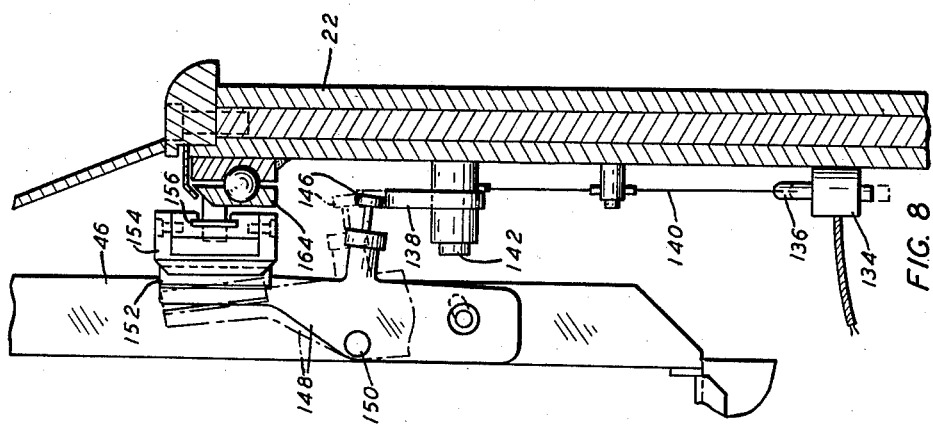
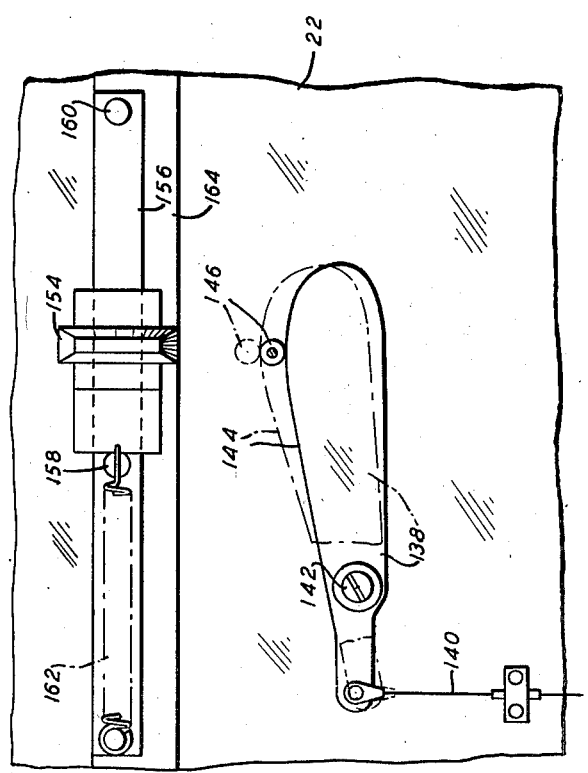
INVENTOR
P. R. POWELL
BY
ATTORNEY Patented Jan. 22, 1952

2,583,119

UNITED STATES PATENT OFFICE 2,583,119

APPARATUS FOR FORMING RETRACTILE CORDS

Paul R. Powell, Baltimore, Md., assignor to Western Electric Company, Incorporated, New York, N. Y., a corporation of New York Application August 19, 1949, Serial No. 111,133

17 Claims. (Cl. 57—71)

This invention relates to apparatus for forming retractile cords, and more particularly to apparatus for forming cords in helical form upon a mandrel.

In the manufacture of certain types of retactile cords, each cord is coiled into a helix on a mandrel, and is twisted axially as it is so coiled. After such a cord has been coiled on a mandrel, the ends thereof are held to the mandrel and the cord is heated and cooled while in a complete helix. The ends of the cord then are straightened to provide straight connecting portions of the cord. In the past, apparatus for forming retractile cords required considerable amount of manual operation and has not been satisfactory to form straight end portions of retractile cords without straightening operations after all portions of the cords have been set in helical form.

An object of the invention is to provide new and improved apparatus for forming retractile cords.

A further object of the invention is to provide new and improved apparatus for simultaneously coiling and twisting cords on mandrels.

A further object of the invention is to provide new and improved apparatus for automatically forming twisted and coiled retractile cords having straight end portions.

An apparatus illustrating certain features of the invention may include a mandrel upon which cordage may be coiled in helical form, and an elongated clamping element for clamping the end of a cord coiled on the mandrel, the end portion of said mandrel and an end of the clamping element being so constructed and arranged that said end of the clamping element interlockably engages the mandrel to hold the cord against uncoiling and against movement around the axis of the cord.

A complete understanding of the invention may be obtained from the following detailed description of an apparatus forming a specific embodiment thereof, when read in conjunction with the appended drawings, in which:

Fig. 2 is an enlarged, fragmentary, vertical section of the apparatus;

Fig. 3 is an enlarged, fragmentary, vertical section taken along line 3—3 of Fig. 2;

Fig. 4 is a view generally similar to Fig. 2;

Fig. 7 is an enlarged, fragmentary, vertical view taken along line 7—7 of Fig. 6;

Fig. 8 is an enlarged, vertical section taken along line 8—8 of Fig. 6;

Fig. 9 is an enlarged, fragmentary, vertical section taken along line 9—9 of Fig. 4, and Fig. 10 is an enlarged, fragmentary, horizontal section taken along line 10—10 of Fig. 4.

Figure 1:
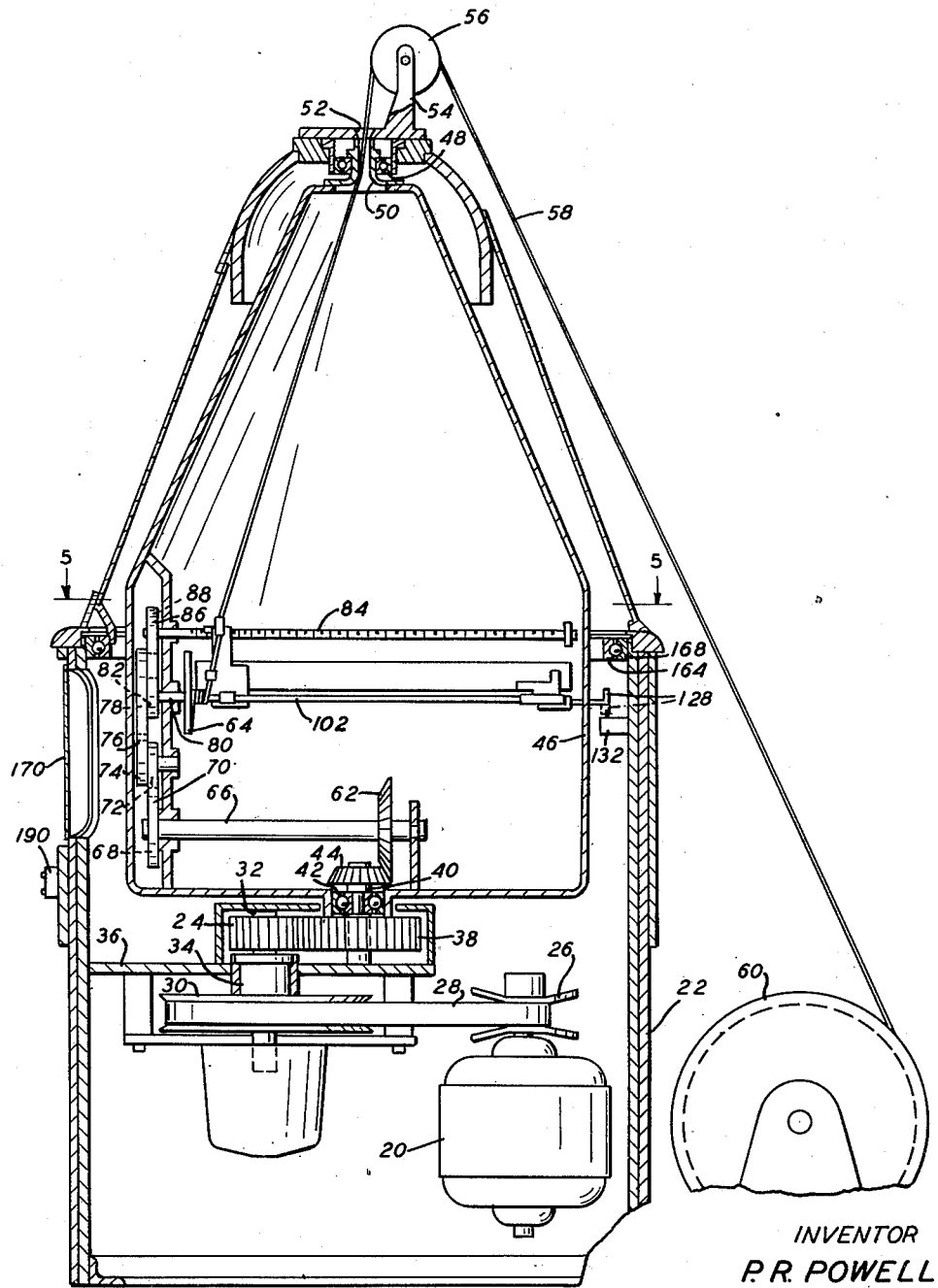
Fig. 1 is a fragmentary, vertical section of an apparatus forming one embodiment of the invention.
Figure 5:
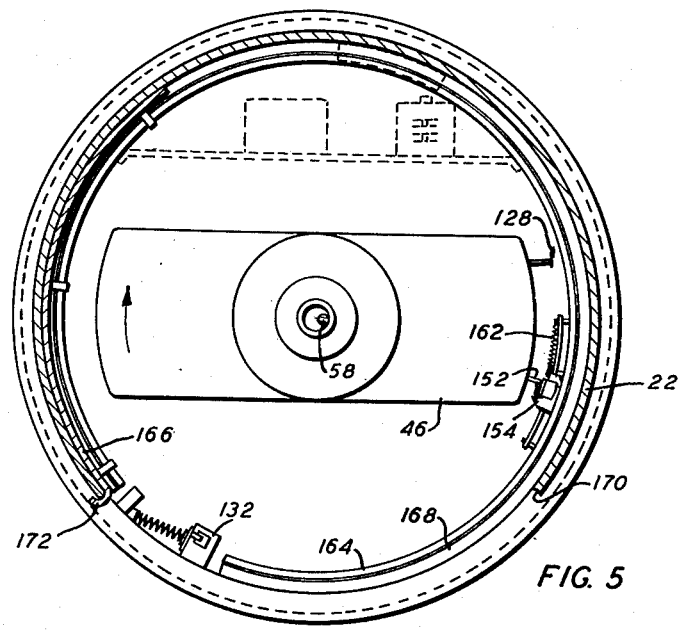
Fig. 5 is a horizontal section taken along line 5—5 of Fig. 1.
Figure 6:
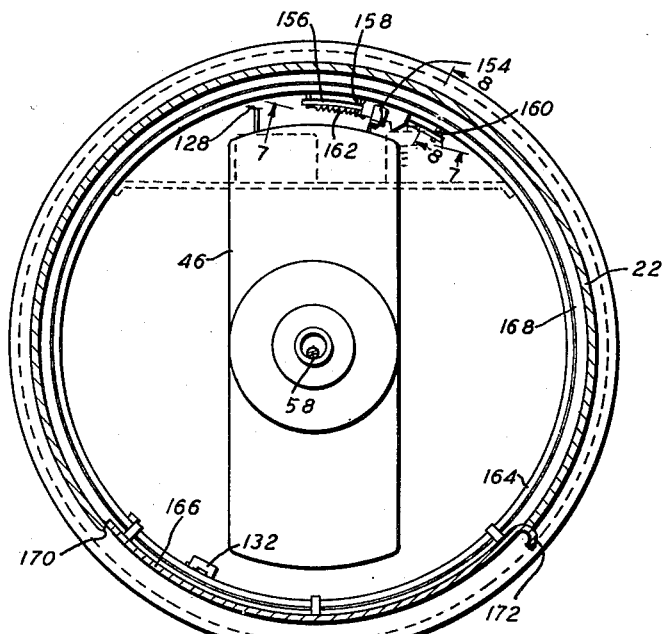
Fig. 6 is a horizontal section similar to Fig. 5.

Referring now in detail to the drawings, an electric motor 20 (Fig. 1) in a housing 22 serves to drive a gear 24 through an adjustable pulley 26, a V-belt 28, an adjustable pulley 30 and a shaft 32, which is mounted in a bearing 34 supported by a bracket 36 fixed to the housing 22. The gear 24 rotates a gear 38, which is mounted on a fixed post 40 by a radial and thrust bearing 42. The post 40 is fixed rigidly to the bracket 36, and supports rigidly a bevel gear 44, which is stationary with respect to the housing 22.

An internal frame 46 is secured to the gear 38 and is rotated by the gear 38 around the axis of the post 40. The upper end of the frame 46, as viewed in Fig. 1, is mounted by a radial bearing 48 secured in the upper portion of the housing 22, and is provided with a guide opening 50 concentric with a guide opening 52 formed in a bracket 54 mounted on the housing 22. The bracket 54 supports a pulley 56 and serves to guide cordage 58 from a supply reel 60 into the openings 52 and 50.

As the frame 46 is revolved, a bevel gear 62 is revolved around the bevel gear 44 and rotates a disc 64 through a shaft 66, a pulley 68, a belt 70, a pulley 72, a pulley 74, a belt 76, a pulley 78 and a shaft 80. A pulley 82 fixed to the shaft 80 serves to rotate a distributor screw 84 through a belt 86 and a pulley 88. The disc 64 is cup-shaped and is provided with a slot 90 into which a wing nut 92 fits. The wing nut 92 serves to tighten or loosen a clamping loop 94, and the wing nut and the clamping loop 94 are mounted on a yoke 96 (Fig. 9), which has a slot 98 therein designed to interlock with grooves 100—100 in a mandrel 102 to hold the mandrel against rotation with respect to the disc 64. The left end of the mandrel 102, as viewed in Fig. 2, fits into a cylindrical socket 104 formed in the shaft 80.

A distributor head 106 is movable toward the right, as viewed in Fig. 2, through a nut segment 108 held in engagement with the distributor screw 84 by a lever 110, and is mounted on a guide bar 112. A rectangular guideway 114 formed in the head 106 guides the cordage to a U-shaped guide 116 on the head, which guides the cordage to the mandrel 102. An adjustable actuating rod 118 carried by the distributor head enters an opening 120 in a bracket 121 as the distributor head approaches the right hand end of the mandrel, and a wedge-shaped end portion 122 of the rod engages a plunger 124 to force the plunger 124 to the right, as viewed in Fig. 3. This causes the plunger to pivot a plate 126 and a cam-shaped tripper 128 secured thereto against the action of a spring-pressed plunger 130, and the tripper 128 is moved to a position in which it will actuate a limit switch 132 (Fig. 1) as it is revolved past the limit switch.

The limit switch 132, when actuated, stops the motor 20 and deenergizes a solenoid winding 134 (Fig. 8) to permit an armature 136 to be moved upwardly, as viewed in Fig. 8, by spring action. The position of a cam 138 pivotable on a mounting screw 142 is controlled by a flexible cable 140 fastened to the armature 136. When the solenoid winding 134 is deenergized, the cam 138 is moved from the position thereof shown in broken lines to the position thereof shown in full lines in Fig. 7 to move a lobe portion 144 of the cam out of the path of a cam follower 146 carried by the frame 46. When the cam is in its broken-line position and the cam follower is carried by the frame 46 past the cam 138, the cam follower engages the lobe 144 and pivots a lever 148 about a pin 150 from the full-line position thereof shown in Fig. 8 to the broken-line position thereof. Then, as the lever 148 is moved past a lug 154, the cam 138 holds a lug 152 on the lever 148 away from the lug 154 and the lug 152 does not engage the lug 154. When the solenoid winding is deenergized, the cam does not pivot the lever 148 and the lug 152 engages the lug 154.

The lug 154 is mounted slidably on a guideway 156 between stops 158 and 160, and a tension spring 162 normally holds the lug 154 against the stop 158. The guideway 156 is fastened rigidly to a ring 164 mounting a door 166 on the housing 22 with a thrust and radial bearing 168 fastened to the housing 22. When the lug 152 engages the lug 154, momentum of the frame 46 moves the door to a position unobstructing a doorway 170 in the housing. A hook 172 on the door stops the door, and this stops the frame in a position in which the mandrel 102 may be removed from the frame.

A yoke 174 (Fig. 4) identical with the yoke 96 carrying a clamping loop 175 and a wing nut 176 is designed to fit over an end portion of the mandrel 102 having grooves 177—177 therein. A yoke 178 carrying a clamping loop 179 and a wing nut 180 also is provided. A spring-pressed socket 181 serves to support rotatably the right hand end of the mandrel 102, as viewed in Fig. 2.

An adjustable stop 184 (Fig. 2) carried by the distributor head 106 serves to engage an abutment 186 on the frame 46 when distributor head 106 is in its starting position. A starting and holding circuit (not shown) for the motor 20 (Fig. 1) and the solenoid winding 134 is operable by a manually operable switch 190.

*Operation*

The frame 46 is revolved to rotate the mandrel 102 through the disc 64, the wing nut 92, the clamping loop 94 and the yoke 96. This twists the cordage 58 and winds it on the mandrel. As cordage 58 is wound on the mandrel, the distributor screw 84 moves the distributor head 106 to the right, as viewed in Fig. 2, through the nut segment 108 engaging the distributor screw 84.

The guideway 114 formed in the distributor head 106 serves to guide the cordage 58 to the U-shaped guide 116 of the head 106, which guides the cordage to the mandrel 102.

When the cordage 58 is coiled on the mandrel 102 with the number of turns desired for a retractile cord, the actuating rod 118 carried by the distributor head 106 is moved by the distributor head into the opening 120 (Fig. 3) in the bracket 121 to move the tripper 128 to the position in which it strikes the limit switch 132 (Fig. 1) as the tripper 128 is revolved past the limit switch, which stops the motor 20, and the frame 46 coasts.

Actuation of the limit switch 132 deenergizes the solenoid winding 134 (Fig. 8), and the armature 136 moves upwardly, as viewed in Fig. 8, from the full-line position thereof to the broken-line position thereof. This moves the lobe portion 144 of the cam 138 out of the path of the cam follower 146 carried by the frame 46, and the lug 152 engages the lug 154. The momentum of the frame 46 moves the door 166 to a position opening the doorway 170 to provide access to the frame, and the frame and the door are stopped by the hook 172 mounted on the door in a position in which the mandrel 102 may be removed from the frame.

To remove the mandrel 102 from the frame 46, the yoke 174 is positioned on the mandrel 102 in the grooves 177—177 and the cordage 58 is clamped thereto to lock the yoke 174 on the mandrel. The yoke 178 is slid into the guideway 114, and the cordage 58 then is clamped to the yoke 178 as shown in Fig. 4. The yoke 178 is locked against rotation by the configuration of the guideway to prevent untwisting of the cordage between the yoke 178 and the supply reel 60 (Fig. 1). The cordage 58 then is severed between the yoke 174 and the yoke 178, and the mandrel 102 is removed from the sockets 104 and 181 after the socket 181 is slid to the right, as viewed in Fig. 2, to free the right hand end of the mandrel 102 and to permit the left hand end thereof to be slid out of the socket 104. The yokes 96 and 174 fit into the grooves 100—100 and 177—177, and are locked thereby against pivotal movement around both the longitudinal axes of the mandrel and any axis transverse to the longitudinal axis of the mandrel 102 except directly away from the mandrel. The cordage holds the yokes against movement directly away from the mandrel.

After the mandrel 102 with the cord wound thereon has been removed from the rest of the apparatus, the lever 110 (Fig. 2) is actuated to move the nut segment 108 out of engagement with the distributor screw 84, and the distributor head 106 is moved to the left, as viewed in Fig. 2, until the adjustable stop 184 carried by the head engages the abutment 186 on the frame 46. The lever 110 then is actuated to move the nut segment 108 back into engagement with the distributor screw. A second mandrel (not shown) identical with the mandrel 102 then is mounted in the sockets 104 and 180, and the yoke 178 with its clamping elements and the end portion of the cordage are pulled out of the guideway 114, and the yoke 178 is secured to the new mandrel and the disc 64. The door 166 then is closed, and the holding circuit is actuated by the momentary, manually operable switch 190 (Fig. 1) to energize the motor 20 and the solenoid winding 134. This starts the apparatus to wind the cordage into a second retractile cord in a manner identical with the above-described operation of winding of a retractile cord.

A plurality of mandrels like the mandrel 102 with cords wound thereon are placed in a suitable chamber (not shown), and the cords heated and cooled in the chamber to set them in the form in which they are held on the mandrels. The yokes like the yokes 96 and 174 then are unclamped from the ends of the cords, and the cords in retractile form with straight end portions are removed from the mandrels.

The above-described apparatus serves to form retractile cords with coiled central portions for retractility and straight end portions for leads without the necessity of coiling the end portions, setting the entire cord in coiled form and then straightening the end portions. It forms the cords with a uniform twist, and requires very little manual effort. The cords on the mandrels clamped by the yokes and associated clamping elements may be handled conveniently for heat treating operations on the cords.

What is claimed is:

1. An apparatus for forming retractile cords, which comprises a mandrel upon which cordage may be coiled in helical form, and a clamping element for clamping the end of a cord coiled on the mandrel, an end portion of said mandrel and an end of the clamping element being so constructed and arranged that said end of the clamping element interlockably engages the mandrel to hold the cord against uncoiling and against movement around the axis of the cord.

2. An apparatus for forming retractile cords, which comprises a mandrel upon which cordage may be coiled in helical form, and a pair of elongated clamping elements for clamping the ends of a cord coiled on the mandrel, the end portions of the mandrel and one end of each of the clamping elements being so constructed and arranged that said ends of the clamping elements interlockably engage the mandrel to hold the cord against uncoiling and against movement around the axis of the cord ends.

3. An apparatus for forming retractile cords, which comprises a mandrel, means for rotating the mandrel to wind cordage thereon into the form of a helix, means for revolving the mandrel about an axis transverse to its longitudinal axis to twist the cordage as it is coiled on the mandrel, means for clamping an end of the cordage against movement relative to the mandrel while the helix is being formed, and means for securing the free end of the cordage to the mandrel when a predetermined length of the helix has been formed.

4. An apparatus for forming retractile cords, which comprises a rotatable head, a mandrel, and a clamp for holding an end of a cord so constructed and arranged that it interlocks with the mandrel and the head so that the mandrel is rotated with the head, the clamp being designed to be quickly detachable from the head.

5. An apparatus for forming retractile cords, which comprises a rotatable head, a mandrel, and a pair of clamps for holding ends of a cord so constructed and arranged that they interlock with the mandrel, one of the clamps serving to interlock with the head so that the mandrel is rotated with the head.

6. An apparatus for winding retractile cords, which comprises a mandrel having grooves oppositely disposed thereon, a fork designed to slide into the grooves, whereby the fork is held against all movement with respect to the mandrel except movement transversely with respect to and away from the mandrel, means carried by the fork for securing cordage thereto, and a rotatable head designed to interlock with the fork for rotating the mandrel through the fork.

7. An apparatus for winding retractile cords, which comprises a mandrel having parallel grooves oppositely disposed thereon, a cordage-gripping element having a parallel-sided notch therein fittable over the grooved portion of the mandrel, whereby the element may be held against all movement with respect to the mandrel except transversely away from the mandrel, and a rotatable head designed to interlock with the cordage-gripping element for rotating the mandrel through the cordage-gripping element.

8. An apparatus for winding retractile cords, which comprises a revolvable carriage, means for revolving the carriage, an electric motor for driving the carriage-revolving means, a mandrel having a pair of grooves oppositely disposed therein near one end thereof, a forked plate designed to interlock with the grooved portion of the mandrel, cordage-clamping means carried by the plate, a head stock mounted on the carriage for receiving the end portion of the mandrel and for interlocking with the cordage-clamping means, a tail stock for receiving the other end of the mandrel, means for rotating the head stock to rotate the mandrel through the cordage-clamping means and the forked plate, a distributor screw extending along the mandrel when the mandrel is held by the head stock and the tail stock, a distributor carriage movable by the distributor screw from the head stock toward the tail stock and releasable from the screw so that it may be quickly returned to the head stock, a cordage guide carried by the distributor carriage and having a socket therein for receiving the forked plate to hold it against rotation, means driven by the carriage-driving means for rotating the distributor screw and the head stock, a tripper carried by the carriage, a limit switch positioned near the path of travel of the tripper as the tripper is revolved with the carriage for stopping the motor when actuated, means operable by the distributor carriage when it approaches the tail stock for moving the tripper to a position in which it actuates the limit switch, a housing having a door opening, a door slidable between a position closing the door opening and a position leaving the opening unobstructed, a lug resiliently mounted on the inside of the door, an arm mounted pivotally on the carriage between a position clearing the lug and a position engaging the lug, means normally operable for holding the arm in its position clearing the lug as the arm is revolved by the carriage past the lug, and means actuable by actuation of the limit switch for deactivating the arm-holding means.

9. An apparatus for winding retractile cords, which comprises a mandrel having grooves oppositely disposed thereon, a fork designed to slide into the grooves, whereby the fork is held against all movement with respect to the mandrel except movement transversely with respect to and away from the mandrel, and means carried by the fork for securing cordage thereto.

10. An apparatus for winding retractile cords, which comprises a mandrel having parallel grooves oppositely disposed thereon, and a cordage-gripping element having a parallel-sided notch therein fittable over the grooved portion of the mandrel, whereby the element may be held against all movement with respect to the mandrel except transversely away from the mandrel.

11. An apparatus for winding retractile cords, which comprises a mandrel having a pair of grooves oppositely disposed therein near one end thereof, a forked plate designed to interlock with the grooved portion of the mandrel, a cordage-clamping means carried by the plate, a head stock for receiving the end portion of the mandrel and interlocking with the cordage-clamping means, a tail stock for receiving the other end of the mandrel, means for rotating the head stock to rotate the mandrel through the cordage-clamping means and the forked plate, means for distributing the cordage on the mandrel in helical form, and means for driving the cordage-distributing means.

12. An apparatus for winding retractile cords, which comprises a mandrel having pairs of grooves oppositely disposed therein near the ends thereof, a pair of forked plates designed to interlock with the grooved portions of the mandrel, cordage-clamping means carried by the plates, a head stock for receiving one of the end portions of the mandrel and for interlocking with the cordage-clamping means on the plate interlocked with the mandrel at that end, a tail stock for receiving the other end of the mandrel, means for rotating the head stock to rotate the mandrel through the last-mentioned cordage-clamping means and forked plate, and means for distributing cordage on the mandrel.

13. An apparatus for winding retractile cords, which comprises a revolvable carriage, means for revolving the carriage, an electric motor for driving the carriage-revolving means, a mandrel having a pair of grooves oppositely disposed therein near one end thereof, a forked plate designed to interlock with the grooved portion of the mandrel, cordage-clamping means carried by the plate, a head stock mounted on the carriage for receiving the end portion of the mandrel and for interlocking with the cordage-clamping means, a tail stock for receiving the other end of the mandrel, means for rotating the head stock to rotate the mandrel through the cordage-clamping means and the forked plate, a distributor screw extending along the mandrel when the mandrel is held by the head stock and the tail stock, a distributor carriage movable by the distributor screw from the head stock toward the tail stock and releasable from the screw so that it may be quickly returned to the head stock, a cordage guide carried by the distributor carriage and having a socket therein for receiving the forked plate to hold it against rotation, means driven by the carriage-driving means for rotating the distributor screw and the head stock, a tripper carried by the carriage, a limit switch positioned near the path of travel of the tripper as the tripper is revolved with the carriage for stopping the motor when actuated, means operable by the distributor carriage when it approaches the tail stock for moving the tripper to a position in which it actuates the limit switch, a housing having a door opening, a door slidable between a position closing the door opening and a position leaving the opening unobstructed, a lug resiliently mounted on the inside of the door, an arm mounted pivotally on the carriage between a position clearing the lug and a position engaging the lug, means normally operable for holding the arm in its position clearing the lug as the arm is revolved by the carriage past the lug, means actuable by actuation of the limit switch for deactivating the arm-holding means, and means for stopping movement of the door by the arm in a position in which is provided convenient access to the mandrel for purposes of removing the mandrel from and inserting the mandrel in the stocks.

14. An apparatus for winding retractile cords, which comprises a revolvable carriage, means for revolving the carriage, means for driving the carriage-revolving means, a mandrel having pairs of grooves oppositely disposed therein near the ends thereof, a plurality of forked plates designed to interlock with the grooved portions of the mandrel, cordage-clamping means carried by the plates, a head stock mounted on the carriage for receiving an end portion of the mandrel and for interlocking with the cordage-clamping means carried by one of the plates interlocked with the portion of the mandrel near the last-mentioned end thereof, a tail stock for receiving the other end of the mandrel, means for rotating the head stock to rotate the mandrel through the last-mentioned cordage-clamping means and the forked plate on which that cordage-clamping means is mounted, a cordage guide having a socket therein for receiving one of the forked plates to hold it against rotation and means for moving the cordage guide to distribute cordage on the mandrel.

15. An apparatus for winding retractile cords, which comprises a revolvable carriage, means for revolving the carriage, a mandrel having pairs of grooves oppositely disposed therein near the ends thereof, a plurality of forked plates designed to interlock with the grooved portions of the mandrel, cordage-clamping means carried by the plate, a head stock mounted on the carriage for receiving the end portion of the mandrel and rotating the mandrel, and one of the forked plates interlocked with the mandrel, a tail stock for receiving the other end of the mandrel, means for rotating the head stock to rotate the mandrel through the last-mentioned forked plate, and means for distributing cordage on the mandrel.

16. An apparatus for forming retractile cords, which comprises a rotatable mandrel, means for securing an end of a length of cordage to said mandrel, means for rotating the mandrel to wind the cordage thereon, means responsive to rotation of the mandrel for uniformly distributing the cordage along the mandrel in the form of a helix as the mandrel is rotated, a rotatable carriage supporting the mandrel and the distributing means, means for rotating the carriage about an axis transverse to the longitudinal axis of the mandrel whereby the cordage will be twisted as it is wound upon the mandrel, and means for securing the free end of the length of cordage to said mandrel when a predetermined length of the helix has been formed.

17. An apparatus for forming twisted retractile cords, which comprises a carriage rotatable about a predetermined axis, a mandrel carried by the carriage and rotatable about an axis transverse to the axis of rotation of the carriage, means for simultaneously rotating the carriage and the mandrel about their respective axes, means for securing an end of a length of cordage to said mandrel, means responsive to rotation of the mandrel for uniformly distributing the cordage along the mandrel in the form of a helix as the mandrel is rotated, said cordage of the helix having been twisted as a result of the simultaneous transverse rotation of the carriage, means responsive to movement of the distributing means for stopping the rotating means when a predetermined length of the helix has been formed, and means for securing the free end of the helix to the mandrel.

PAUL R. POWELL.

REFERENCES CITED

The following references are of record in the file of this patent:

UNITED STATES PATENTS

| Number | Name | Date |
|---|---|---|
| 960,913 | Heany | June 7, 1910 |
| 1,562,645 | Jones | Nov. 24, 1925 |
| 2,136,388 | Lowe | Nov. 15, 1938 |
| 2,143,748 | Webster et al. | Jan. 10, 1939 |
| 2,229,462 | Kurtz | Jan. 21, 1941 |